United States Patent
Griffith et al.

[11] Patent Number: 6,078,628
[45] Date of Patent: Jun. 20, 2000

[54] NON-LINEAR CONSTANT ENVELOPE MODULATOR AND TRANSMIT ARCHITECTURE

[75] Inventors: Scott Griffith, San Clemente; Ricke W. Clark, Irvine, both of Calif.

[73] Assignee: Conexant Systems, Inc., Newport Beach, Calif.

[21] Appl. No.: 09/040,225

[22] Filed: Mar. 13, 1998

[51] Int. Cl.$^7$ .............................. H03C 1/52; H04L 27/04
[52] U.S. Cl. ......................... 375/300; 330/285; 332/106; 332/159
[58] Field of Search ..................... 375/295, 296, 375/297, 300, 308; 330/278, 285; 332/103, 104, 106, 149, 159

[56] References Cited

U.S. PATENT DOCUMENTS

| | | | |
|---|---|---|---|
| 5,579,342 | 11/1996 | Crozier | 375/296 |
| 5,633,893 | 5/1997 | Lampe et al. | 375/297 |
| 5,699,383 | 12/1997 | Ichiyoshi | 375/297 |
| 5,793,817 | 8/1998 | Wilson | 375/297 |
| 5,978,421 | 11/1999 | Shoji | 375/297 |

*Primary Examiner*—Chi H. Pham
*Assistant Examiner*—Bryan Webster
*Attorney, Agent, or Firm*—Price Gess & Ubell

[57] ABSTRACT

A constant envelope modulator and transmit architecture for a wireless communication system is provided and a method for operating the same. The constant envelope modulator includes a differential encoder which receives data to be transmitted and creates in-phase and quadrature components of a modulation signal to be transmitted. The in-phase and quadrature components are passed through digital filters in order to give the modulation a particular shape. The in-phase and quadrature components of the modulation signal have both phase information and amplitude information on the modulation, where the constant envelope modulator removes the amplitude modulation (AM) information from the modulation signal to provide constant envelope in-phase and quadrature modulation signals and an accompanying AM envelope signal. The resultant constant envelope in-phase and quadrature modulation signals are combined at a radio frequency for transmission into a constant envelope phase modulation signal. The constant envelope phase modulation signal is fed through a non-linear power amplifier to bring the modulation signal to a proper output power level for transmission. The AM content of the modulation signal is then reintroduced into the constant envelope phase modulation signal at the non-linear power amplifier after the point of amplification of the constant envelope phase modulation signal in order to reintroduce the amplitude information into the signal. The constant envelope modulator and transmit architecture of the present invention allows the entire structure to be operated in an efficient, non-linear mode.

13 Claims, 4 Drawing Sheets

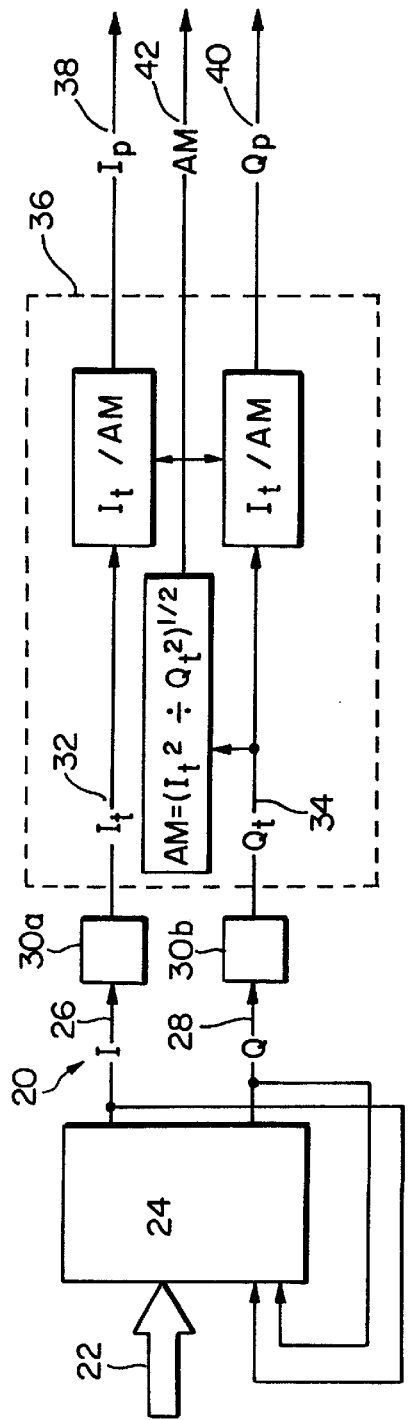
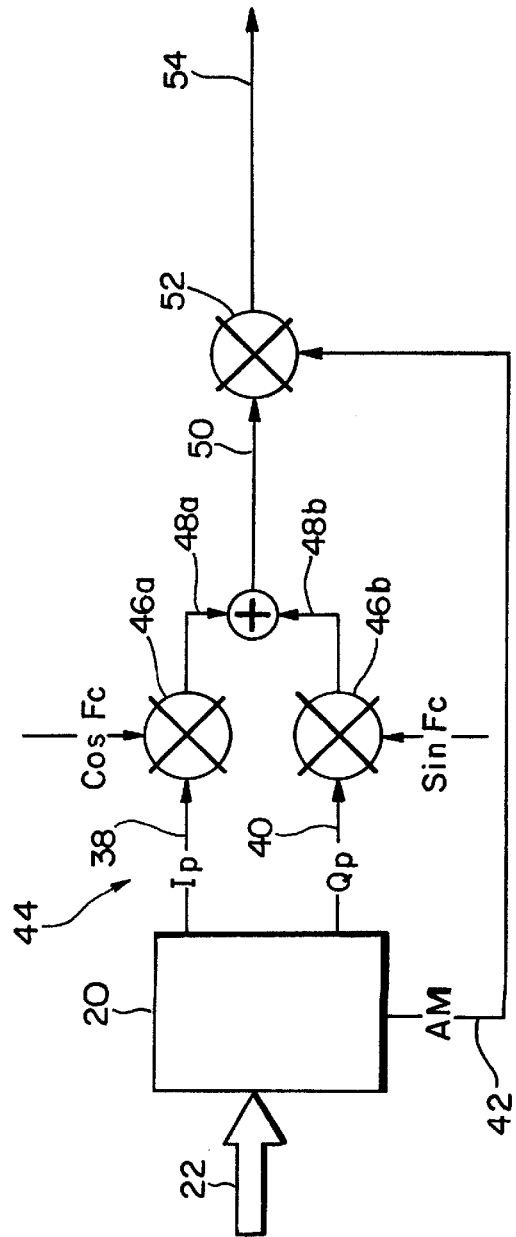
FIG. 2A
FIG. 2B

\# NON-LINEAR CONSTANT ENVELOPE MODULATOR AND TRANSMIT ARCHITECTURE

BACKGROUND OF THE INVENTION

1. Field of the Invention

The present invention relates generally to a wireless communication system, and specifically to a non-linear, constant envelope modulator and transmit architecture for a wireless communication system.

2. Description of the Related Art

Mobile wireless phones have gained widespread use throughout the world. These phones typically utilize cellular network systems, such as PHS, having base stations serving a predetermined area or cell, where each base station has a certain number of channels for communicating with handsets within that cell. The transmitted signals undergo some type of modulation to transmit a signal on an available channel within the predetermined cell, where the modulated signals are amplified to the proper power level for transmission. The power levels of the signals transmitted by the handsets are precisely controlled by power amplifiers in order to prevent signal interference from occurring at the base station with signals received from other handsets, while also ensuring a quality signal is transmitted. Digital modulators, such as a $\pi/4$ differential quadrature phase shift-keying (DQPSK) modulator, are typically used for PHS handsets and other digital wireless phones. A $\pi/4$ DQPSK modulation signal contains both phase and amplitude information, which requires the transmit chain of the handset to maintain a certain level of linearity in order to meet system requirements of adjacent channel power and transmit accuracy. The linearity requirements on the power amplifier require it to be operated in a moderately linear power mode, such as a Class AB mode. Moderately linear power modes are less efficient than highly non-linear power modes and consume a larger amount of current to operate. Thus, the large amount of current consumed by a handset using a linear power amplifier reduces the talk time of the handset or requires the use of a large battery.

Referring now to FIG. 1, a conventional modulator and transmit architecture for a wireless handset is illustrated. Information to be transmitted by the handset is fed into a differential encoder 10, where an in-phase component (I) and a quadrature component (Q) of the modulation signal to be transmitted is created. The I and Q components are then passed through digital filters 12 which give the modulation a particular shape. The resultant I and Q filtered signals are then modulated at a radio frequency for transmission at mixers 16 and combined as a $\pi/4$ DQPSK modulation signal. The $\pi/4$ DQPSK modulation signal is then amplified to bring the signal to a desired power level for transmission.

This type of conventional modulator and transmit architecture shown in FIG. 1 necessarily operates using a moderately linear power amplifier to maintain the requisite level of linearity, which undesirably operates the handset in a non-efficient mode. The talktime of the handset could be increased if a more efficient, non-linear power amplifier were utilized in the transmit architecture. However, the in-phase and quadrature components of the modulation signal and, thus, the phase modulation signal will have both phase and amplitude modulation (AM) components. Thus, both the phase and amplitude modulation components of the signals are fed through the power amplifier. When an AM envelope signal is amplified with a nonlinear power amplifier, the AM envelope on the output of the amplifier is distorted due to the spectral spreading of the AM envelope signals which will occur in the power amplifiers. Therefore, non-linear power amplifiers can not be used with current modulator and transmit architectures without causing spectral spreading and violating channel power specifications.

There is a need for a constant envelope modulator and transmit architecture which allows an efficient, non-linear power amplifier to be used to amplify the signal to a desired power level. Moreover, there is a need for a constant envelope modulator and transmit architecture which does not amplify the amplitude information on the modulation signal when amplifying the modulation signal to a desired power level in order to prevent spectral spreading resulting from amplification of the amplitude information on the modulation signal.

OBJECTS AND SUMMARY OF THE INVENTION

It is a primary object of the present invention to overcome the aforementioned shortcomings associated with the prior art.

Another object of the present invention is to provide a constant envelope modulator and transmit architecture for a wireless telephone handset having an improved efficiency to provide an increased talk time.

Yet another object of the present invention is to provide a constant envelope modulator and transmit architecture for a wireless telephone which consumes less current by operating with non-linear power amplification.

It is another object of the present invention to provide a constant envelope modulator and transmit architecture for a wireless telephone which reduces distortion of the transmitted signal by only amplifying a constant envelope phase modulation representation of the modulated signal.

These as well as additional objects and advantages of the present invention are achieved by providing a constant envelope modulator and transmit architecture for signals transmitted from a wireless telephone handset. The constant envelope modulator includes a differential encoder for creating in-phase and quadrature components of a modulation signal from data to be transmitted. The in-phase and quadrature components are passed through digital filters in order to give the modulation a particular shape. The in-phase and quadrature components of the modulation signal have both phase information and amplitude information on the modulation. The constant envelope modulator then removes the amplitude modulation (AM) content from the signal to output constant envelope in-phase and quadrature modulation signals and an accompanying AM envelope signal. The resultant constant envelope in-phase and quadrature modulation signals are combined at a radio frequency for transmission into a constant envelope phase modulation signal. The constant envelope phase modulation signal is fed through a non-linear power amplifier to bring the modulation signal to a desired power level for transmission. The AM content of the modulation signal is then reintroduced into the constant envelope phase modulation signal at the non-linear power amplifier after the point of amplification of the constant envelope phase modulation signal in order to recreate the modulation signal.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings in which the reference numerals designate like parts throughout the figures thereof and wherein:

FIG. 2(A) is a schematic illustration of a constant envelope modulator formed in accordance with a preferred embodiment of the present invention.

FIG. 2(B) is a schematic illustration of a preferred embodiment of the constant envelope modulator and transmit architecture for a telephone handset of the present invention.

DETAILED DESCRIPTION OF THE PREFERRED EMBODIMENTS

Figure 1:
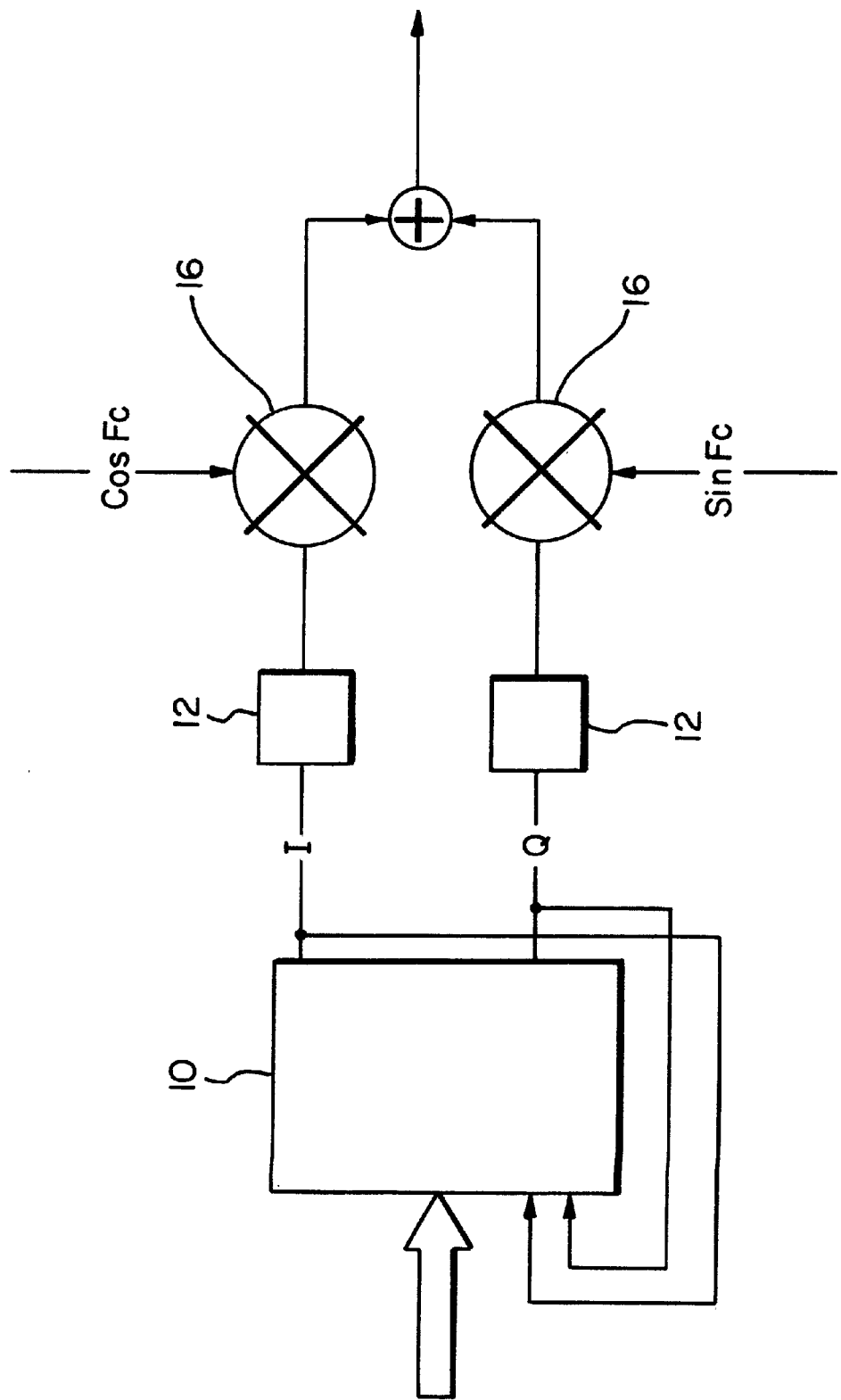
FIG. 1 is a schematic illustration of a conventional π/4 DQPSK modulator and transmit architecture for a telephone handset.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system for modulating and transmitting a signal in a wireless communication system.

Referring now to FIG. 2(A), a schematic illustration of a constant envelope modulator 20 formed in accordance with a preferred embodiment of the present invention is illustrated. The constant envelope modulator 20 is preferably utilized in a wireless system for communicating data, such as a PHS telephone handset or other similar wireless data transmission device. The constant envelope modulator 20 receives data 22 to be transmitted from the handset, and the data is fed through a differential encoder 24 to create an in-phase component 26 and a quadrature component 28 of the modulation signal to be transmitted by the handset. The in-phase component 26 and quadrature component 28 are passed through digital filters 30a and 30b, respectively, in order to give the modulation a particular shape. A time-dependent in-phase component 32, $I_t$, and a time-dependent quadrature component 34, $Q_t$, are output by digital filters 30a and 30b, respectively, where $I_t$ and $Q_t$ contain both phase information and amplitude information. In order to remove the amplitude information from the modulation signal, the in-phase component 32 and quadrature component 34 are fed through an application specific integrated circuit (ASIC) 36 or other similar device designed to remove the amplitude envelope from the modulation signal. The ASIC 36 removes the amplitude modulation (AM) information from the in-phase component 32 and quadrature component 34 of the modulation signal to provide an in-phase modulation signal 38, $I_p$, and a quadrature modulation signal 40, $Q_p$, where $I_p$ signal 38 and $Q_p$ signal 40 have a constant envelope and contain phase information only. ASIC 36 also outputs an accompanying amplitude (AM) envelop signal 42 containing the amplitude information removed from the modulation signal, wherein signals AM, $I_p$, and $Q_p$ are represented by the following equations:

$$AM=(I_t^2+Q_t^2)^{1/2} \quad (1)$$

$$I_p=I_t/AM \quad (2)$$

$$Q_p=Q_t/AM \quad (3)$$

Thus, the constant envelope modulator 20 converts the data 22 input into the modulator 20 into a constant envelope in-phase modulation signal 38, a constant envelope quadrature modulation signal 40, and an amplitude envelope signal 42.

Referring now to FIG. 2(B), the remaining components of the transmit architecture 44 for the wireless telephone handset connected to the constant envelope modulator 20 are illustrated in schematic form. The constant envelope in-phase and quadrature modulation signals 38 and 40 are fed through mixers 46a and 46b, respectively, where the signals are frequency multiplied to a desired radio frequency, $F_c$, for transmission. Frequency-multiplied in-phase and quadrature modulation signals 48a and 48b are output by mixers 46a and 46b, respectively, and fed into an adder 48, where the in-phase modulation signal 48a and quadrature modulation signal 48b are combined into a constant envelope phase modulation signal 50.

The constant envelope phase modulation signal 50 is fed through a non-linear power amplifier 52 in order to bring the output power level of the modulation signal 50 to a desired value for transmission. The amplitude envelope 42 of the modulation signal is then reintroduced into the constant envelope phase modulation signal 50 in the non-linear power amplifier 52 by multiplying modulation signals 42 and 50 together after the point of amplification of the constant envelope phase modulation signal 50 in order to recreate modulation signal 54 output by power amplifier 52. Signals having a constant envelope may be amplified without distortion by a non-linear power amplifier, since a non-linear power amplifier will not cause spectral spreading with a constant envelope signal. Thus, non-linear power amplifier 52 is utilized with the transmit architecture 44 of the preferred embodiment of the present invention to amplify the constant envelope phase modulation signal 50 without distortion. The amplitude information 42 of the modulation signal is then reintroduced in the power amplifier 52 after the point of amplification, so that the amplitude information signal 42 is not amplified by power amplifier 52.

Figure 3A:
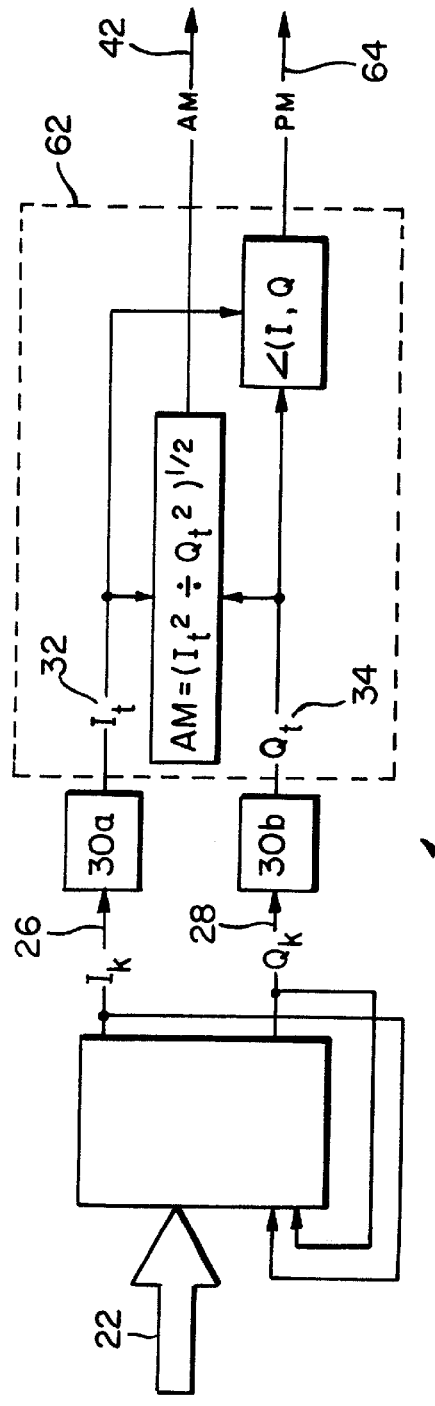
FIG. 3(A) is a schematic illustration of a constant envelope modulator formed in accordance with an alternative embodiment of the present invention.

Referring now to FIG. 3(A), an alternative embodiment of the constant envelope modulator 60 is shown in schematic form, where all similarly numbered components function equivalently with those described in connection with constant envelope modulator 20. The application specific integrated circuit (ASIC) 62 removes the amplitude modulation (AM) information from the in-phase component 32 and quadrature component 34 of the modulation signal to provide an amplitude (AM) envelope signal 42 containing the amplitude information removed from the modulation signal. The ASIC 62 further extracts the phase modulation (PM) information from the in-phase component 32 and quadrature component 34 of the modulation signal by performing a cartesian to polar coordinate conversion. ASIC 62 outputs this PM information on a PM signal 64, where PM =∠($I_t$, $Q_t$).

Figure 3B:
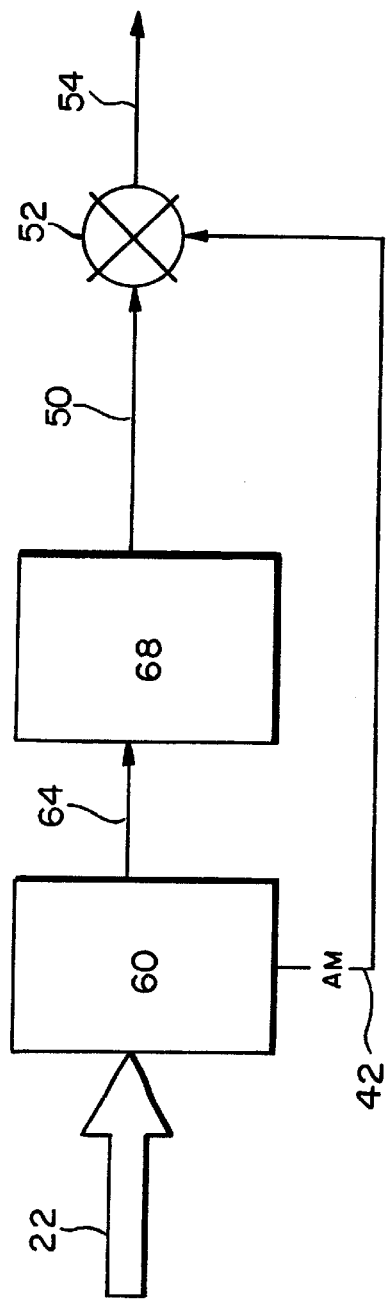
FIG. 3(B) is a schematic illustration of an alternative embodiment of the constant envelope modulator and transmit architecture of the present invention with the constant envelope modulator of FIG. 3(A).

The remaining components of the transmit architecture 66 for the wireless telephone handset connected to the constant envelop modulator 60 are illustrated in schematic form in FIG. 3(B). The PM signal 64 is used to control a Direct Digital Synthesizer (DDS) 68, where constant envelope phase modulation signal 50 is output from DDS 68. Alternatively, DDS 68 may be replaced by either: 1) an oscillator followed by a phase modulator where PM signal 64 controls the phase modulation, or 2) a differentiator followed by a voltage-controlled oscillator (VCO). However, DDS 68 is preferably utilized to provide the precision and robustness of a digital solution. The constant envelope phase modulation signal 50 is then amplified by non-linear power amplifier 52 and combined with amplitude envelope 42 in the same manner as described in connection with transmit architecture 44.

The constant envelope modulator and transmit architectures of the present invention allow a modulation signal to be generated equivalent to modulation signals produced by modulator and transmit architectures operating in a linear mode, while running the power amplifier in a non-linear, higher efficiency mode. Power amplifier 52 is preferably a Class C or Class D power amplifier. However, it is understood that any non-linear power amplifier may be used as power amplifier 52. By operating in a non-linear power mode, a significant reduction in current consumption by the power amplifier 52 is achieved as compared to operating a linear power amplifier. The lower current consumption increases the available talk time of a wireless handset while using a battery similar to those being used with handsets having linear power amplifiers. Alternatively, the lower current consumption of the non-linear power amplifier of the present invention allows the size of the battery to be reduced while achieving the same talk time as handsets having linear power amplifiers.

Figure 4:
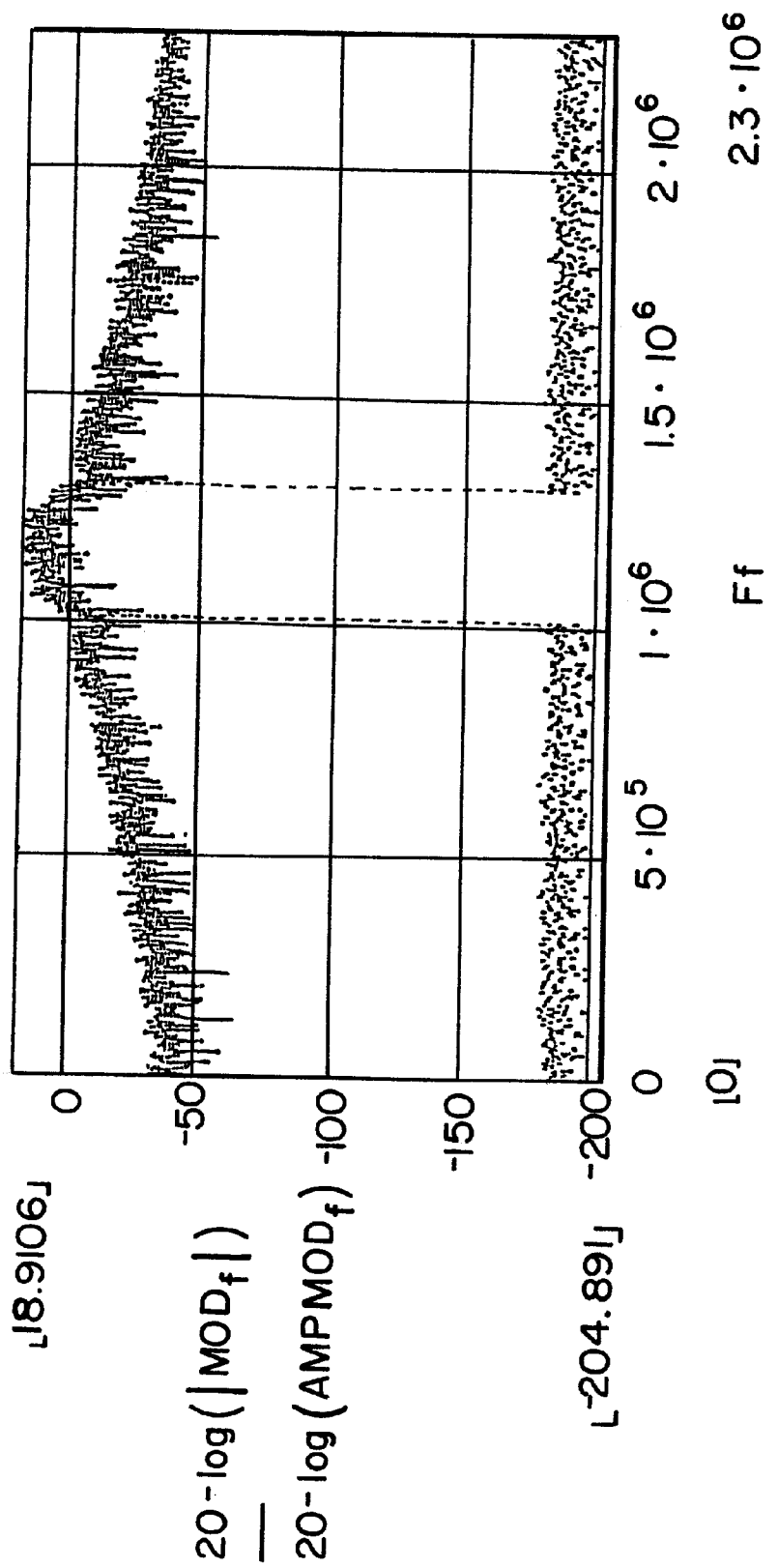
FIG. 4 is a graphical illustration of the RF spectra of the constant envelope in-phase and quadrature modulation signal of the constant envelope modulator and transmit architecture of the present invention.

Referring now to FIG. 4, the spread spectra of the constant envelope phase modulation signal 50 and a $\pi/4$ DQPSK signal 56 including amplitude content are illustrated for comparison. The integrated spectral power of modulation signal 50 was found to be 2.5 dB greater than the $\pi/4$ DQPSK signal 56. The spread spectrum of the constant envelope phase modulation signal 50 produced is a broadband spread signal, requiring additional bandwidth than a conventional $\pi/4$ DQPSK signal 56 having both phase and amplitude information present. However, once the amplitude information signal 42 is reintroduced into the amplified constant envelope phase modulation signal 50, all of the power is converted to be in-band to produce a clean spectrum. The in-band spectra of the reconstituted output signal 54 transmitted by the handset is shown between the dashed lines in FIG. 4. Further, the reconstituted output signal 54 does not possess any Adjacent Channel Power content, so as not to detrimentally affect the number of handset transmitters a particular base station may handle.

As can be seen from the foregoing, a constant envelope modulator and transmit architecture formed in accordance with the present invention allows a wireless telephone handset to operate in a more efficient, non-linear mode. Moreover, by forming a constant envelope modulator and transmit architecture in accordance with the present invention, a wireless telephone handset can operate using less current, thus allowing the talktime of the handset to be increased or the battery size of the handset to be decreased.

In each of the above embodiments, the structures of the constant envelope modulator and transmit architecture for a wireless transmission system of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A constant envelope modulator and transmit architecture for a wireless transmission system, comprising:
   a constant envelope modulator including:
      an input means for receiving data to be transmitted;
      a differential encoder for creating a modulation signal having an in-phase modulation component and a quadrature modulation component from said received data; and
      a constant envelope generation means for removing amplitude information from the modulation signal to convert the modulated signal into constant envelope in-phase and quadrature modulation signals and an amplitude envelope signal;
   adding means for combining said constant envelope in-phase and quadrature modulation signals at a frequency for transmission to produce a constant envelope phase modulation signal; and
   a power amplifier for amplifying the constant envelope phase modulation signal to a desired power level for transmission;
   wherein the amplitude envelope signal is combined with the constant envelope phase modulation signal in the power amplifier after the constant envelope phase modulation signal has been amplified.

2. The constant envelope modulator and transmit architecture of claim 1, wherein said constant envelope modulator further includes a pair of digital filters connected between said differential encoder and said constant envelope generation means for providing a predetermined shape to the modulation signal; wherein the in-phase and quadrature modulation components of the modulation signal are respectively fed through one of the pair of digital filters.

3. The constant envelope modulator and transmit architecture of claim 1, wherein said constant envelope modulator modulates a digital signal.

4. The constant envelope modulator and transmit architecture of claim 3, wherein said constant envelope modulator is a $\pi/4$ DQPSK modulator.

5. The constant envelope modulator and transmit architecture of claim 1, wherein said power amplifier is non-linear.

6. The constant envelope modulator and transmit architecture of claim 5, wherein said power amplifier is either a Class C or Class D power amplifier.

7. An improved method of modulating and transmitting a signal in a wireless transmission system, comprising the steps of:
   encoding data to be transmitted into a modulation signal having an in-phase modulation component and a quadrature modulation component; wherein said modulation signal includes both phase information and amplitude information;
   removing the amplitude information from the modulation signal to convert the modulation signal into constant envelope in-phase and quadrature modulation signals and an amplitude envelope signal;

combining the constant envelope in-phase and quadrature modulation signals at a frequency for transmission to produce a constant envelope phase modulation signal;

amplifying the constant envelope phase modulation signal to a desired power level for transmission; and reintroducing the amplitude envelope signal into the constant envelope phase modulation signal after the constant envelope phase modulation signal has been amplified.

8. The method of modulating and transmitting a signal in a wireless transmission system of claim 7, further comprising the step of filtering the modulation signal prior to removing amplitude information from the signal in order to provide a predetermined shape to the modulation signal.

9. The method of modulating and transmitting a signal in a wireless transmission system of claim 7, wherein the constant envelope phase modulation signal is amplified using a non-linear power amplifier.

10. A wireless transmission system, comprising:

a differential encoder for receiving input data to be transmitted and producing an in-phase modulation component and a quadrature modulation component from the received data;

an application specific integrated circuit (ASIC) for removing amplitude modulation (AM) information from the in-phase and quadrature modulation component to produce an AM envelope signal, a constant envelope in-phase modulation signal and a constant envelope quadrature modulation signal;

a first mixer for frequency multiplying the constant envelope in-phase modulation signal to a desired radio frequency;

a second mixer for frequency multiplying the constant envelope quadrature modulation signal to a desired radio frequency;

an adder for combining the constant envelope in-phase modulation signal and the constant envelope quadrature modulation signal after frequency multiplication to produce a constant envelope phase modulation signal; and a power amplifier for amplifying the constant envelope phase modulation signal to a desired level and multiplying the amplified constant envelope phase signal with the AM envelope signal to produce a modulation signal for transmission.

11. The wireless transmission system of claim 10 wherein the power amplifier is a non-linear power amplifier.

12. A method for producing a modulation signal, comprising the steps of:

producing an in-phase modulation component and a quadrature modulation component from input data to be transmitted;

removing amplitude modulation (AM) information from the in-phase and quadrature modulation component to produce an AM envelope signal, a constant envelope in-phase modulation signal and a constant envelope quadrature modulation signal;

frequency multiplying the constant envelope in-phase modulation signal to a desired radio frequency;

frequency multiplying the constant envelope quadrature modulation signal to a desired radio frequency;

combining the constant envelope in-phase modulation signal and the constant envelope quadrature modulation signal after frequency multiplication to produce a constant envelope phase modulation signal;

amplifying the constant envelope phase modulation signal to a desired level; and multiplying the amplified constant envelope phase signal with the AM envelope signal to produce a modulation signal for transmission.

13. The method of claim 12 wherein the amplification in the amplifying step is non-linear.

* * * * *